J. BEACH.
PIPE AND HOSE COUPLING.
APPLICATION FILED DEC. 18, 1918.
1,337,427.
Patented Apr. 20, 1920.
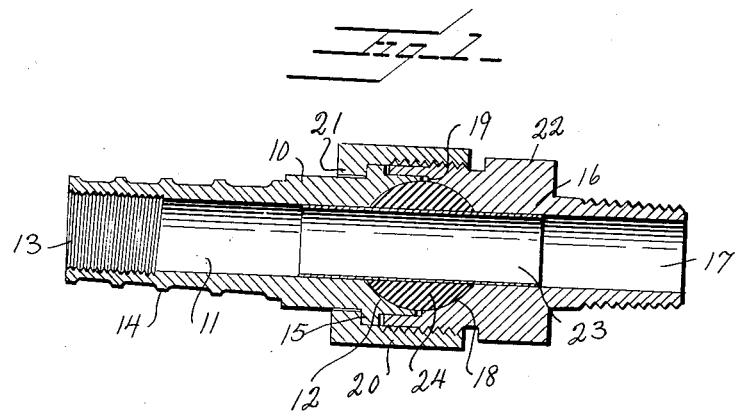
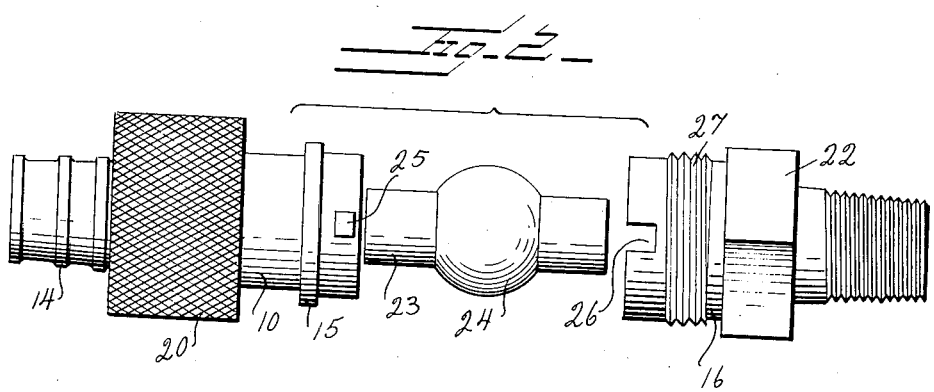
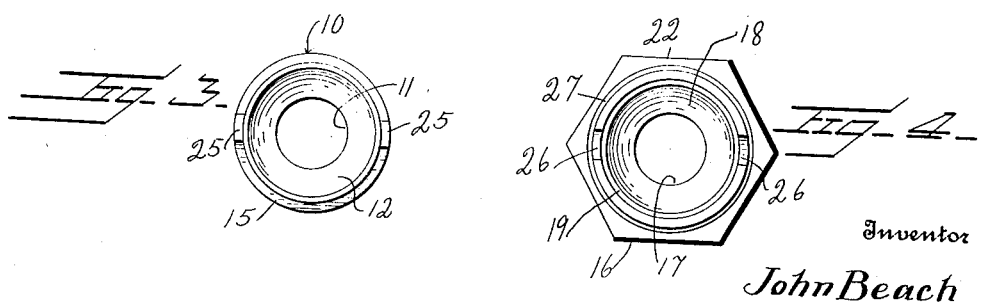
Inventor
John Beach
By Watson E. Coleman
Attorney

UNITED STATES PATENT OFFICE.

JOHN BEACH, OF SPRINGFIELD, OHIO, ASSIGNOR OF ONE-HALF TO P. F. GOLDEN, OF SPRINGFIELD, OHIO.

PIPE AND HOSE COUPLING.

1,337,427.  Specification of Letters Patent.  Patented Apr. 20, 1920.

Application filed December 18, 1918. Serial No. 267,295.

*To all whom it may concern:*

Be it known that I, JOHN BEACH, a citizen of the United States, residing at Springfield, in the county of Clark and State of Ohio, have invented certain new and useful Improvements in Pipe and Hose Couplings, of which the following is a specification, reference being had to the accompanying drawings.

This invention relates to pipe connections, and particularly to a hose connection so constructed that a flexible hose may be detachably engaged with a metallic pipe.

The general object of this invention is to provide a coupling for the purpose above described which will be of very simple construction, easily applied and removed, and which will tightly pack the joint so as to prevent the leakage of any water at the joint.

A further object is to provide a construction of this character in which there will be no gasket to remove, replace or adjust while making the coupling.

A further object is to provide a coupling of this character wherein the bore is perfectly straight so as to impede the passage of water as little as possible.

A still further object is to provide a coupling having a connecting sleeve including a globular packing which prevents leakage not only when the coupling is fastened, but when the coupling is loose even to the point of separation of the coupling sections.

Other objects will appear in the course of the following description.

My invention is illustrated in the accompanying drawing, wherein:—

Figure 1 is a longitudinal sectional view of a coupling constructed in accordance with my invention;

Fig. 2 is an elevation of the coupling or pipe connection with the parts separated;

Fig. 3 is an end elevation of the male member of the coupling; and

Fig. 4 is an end elevation of the female member.

Referring to these drawings, and particularly to Figs. 1 and 2 it will be seen that my improved coupling or pipe connection comprises the male member 10 which is angular in cross section and is formed with the bore 11 uniform for its entire length. At one end this male member 10 is enlarged and formed with the hemispherical socket 12 intersecting the bore 11 and at its opposite end the bore of the male member 10 is internally screw-threaded as at 13. Annular ribs 14 are formed upon the exterior of the male member and adjacent its inner end there is formed the annular exterior flange 15. The female member 16 has a uniform bore 17 having the same diameter as the bore 11 and this member is also formed with a hemispherical socket 18 at one end matching the socket 12 and intersecting the bore 17. Beyond the socket 18 the female member is enlarged in internal diameter to provide a shoulder 19 confronting the extremity of the male member 10 and the female member is exteriorly screw-threaded for engagement by a collar 20 having an inwardly projecting flange 21 adapted to engage one side of the shoulder 15.

The end of the male member lies closely adjacent the shoulder 19, while the end of the female member lies closely adjacent the other side of the shoulder 15, to permit the male and female members to form a perfect spherical socket, and to prevent leakage.

The female coupling member is also formed with the many-sided portion 22 whereby a wrench may be applied to hold the member 16 while the collar 20 is being removed therefrom, the collar 20 being preferably knurled or otherwise formed so as to secure a good grip thereon.

Disposed within the bores 11 and 17 is a sleeve of this metal 23 and formed upon this sleeve, as by casting thereon or otherwise forming thereon, is a bulbous or globular packing 24 which may be of rubber, lead or other like compressible material, through which the sleeve 23 passes and which fills the confronting semi-spherical sockets 12 and 18. As before remarked this packing 24 may be of rubber or of lead. If the joint is to be used for pipes conducting air, water or oil, a rubber packing may be used whereas if the pipe is a steam pipe, a metal bulb will be used.

Formed upon the wall forming the extremity of the socket 12 as shown in Figs. 2 and 3 are the radially projecting lugs 25 and the confronting extremity of the female coupling member 16 is slotted as at 26 to receive these lugs 25 so as to prevent any rotation of the coupling members with relation to each other when the lugs 25 are disposed within the slots 26. The female member is also formed with screwthreads 27 for engagement by the internal screw-threads of the collar 20.

It will be seen that as the collar 20 is turned, assuming that the male member is inserted within the female member, the male and female members will be drawn toward each other and against the packing 24 thus compressing the packing and forcing it to fill the sockets 12 and 18 and form a tight joint around the coupling. The thin sleeve 23 will form practically no impediment at all to the passage of fluid through the coupling and therefore a straight line will be provided for the passage of fluid.

Another important advantage of this coupling lies in the fact that when the two sections of the coupling are disengaged from each other and separated, the sleeve 23 with the packing 24 thereon will remain in engagement with one of the sections or members. As far as known to me, couplings of this character have heretofore been provided with gaskets or packing rings and these have to be seated properly before a tight joint can be secured and often become deranged when removing the coupling sections or replacing them. Therefore there is considerable trouble in connecting the coupling because of the derangement of the gaskets and the care required to keep them in place. This is entirely avoided with my construction. It is obvious, of course, that the device may be used in a variety of different circumstances and that it may be made in various sizes and adapted to different circumstances of operation.

I claim:—

1. A coupling of the character described including male and female sections having bores of uniform diameter, a hemispherical socket in the end of the male section, a hemispherical socket in the female section adjacent its end, the end of said female section being reduced to provide an internal shoulder, an annular flange on the male section, a collar having a flange engaged with one side of the annular flange of the male section and connecting the female section to the male section, the end of the female section lying closely adjacent the other side of the annular flange, the end of the male section lying closely adjacent the internal shoulder of the female section to coöperate with the hemispherical socket of the female section to provide a spherical socket, means for preventing rotation of said male and female sections with respect to each other, and packing means disposed in said spherical socket.

2. A coupling of the character described including male and female sections having bores of uniform diameter, the outer surface of the male section having an annular flange, a hemispherical socket in the end of the male section, said female section having a reduced end providing an internal shoulder, a hemispherical socket in said female section adjacent the reduced end, said reduced end surrounding the end of the female section and engaging the annular flange, means engaging said annular flange and connecting the female section to the male section, a connecting sleeve including a globular packing surrounding the exterior, intermediate portion of the sleeve, said sleeve forming a continuation of the passages in the male and female sections and coöperating with the packing to prevent leakage when the sections are securely or loosely connected to each other.

In testimony whereof I hereunto affix my signature in the presence of two witnesses.

JOHN BEACH.

Witnesses:
  CONSTANTINE LINK,
  B. F. GOLDEN.